(12) United States Patent
Gupta et al.

(10) Patent No.: US 7,788,176 B2
(45) Date of Patent: Aug. 31, 2010

(54) SYSTEM AND METHOD FOR PROVIDING ONLINE SMS GAMES

(75) Inventors: Shekhar Gupta, Overland Park, KS (US); Mike A. Roberts, Overland Park, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 0 days.

(21) Appl. No.: 12/257,972

(22) Filed: Oct. 24, 2008

(65) Prior Publication Data

US 2010/0106612 A1    Apr. 29, 2010

(51) Int. Cl.
*G06F 21/00* (2006.01)
*A63F 9/24* (2006.01)

(52) U.S. Cl. .................................... 705/50; 463/41

(58) Field of Classification Search .................. 705/26, 705/50
See application file for complete search history.

(56) References Cited

U.S. PATENT DOCUMENTS

| | | | | | |
|---|---|---|---|---|---|
| 5,878,141 | A | * | 3/1999 | Daly et al. ........... | 705/78 |
| 2004/0198403 | A1 | * | 10/2004 | Pedersen et al. ........ | 455/517 |
| 2005/0192078 | A1 | * | 9/2005 | Jawaharlal ............ | 463/17 |
| 2007/0265091 | A1 | * | 11/2007 | Aguilar et al. ........ | 463/42 |
| 2008/0161111 | A1 | * | 7/2008 | Schuman .............. | 463/41 |

FOREIGN PATENT DOCUMENTS

WO    WO 2009/051503 A2 *    4/2009

* cited by examiner

*Primary Examiner*—Calvin L Hewitt, II
*Assistant Examiner*—Zeshan Qayyum
(74) *Attorney, Agent, or Firm*—Sonnenschein Nath & Rosenthal LLP (57) ABSTRACT

In accordance with the disclosed embodiments, a system and method is presented for providing online SMS games to any SMS equipped device without having to install any additional applications on the SMS equipped device. In one embodiment, the method includes receiving a text message from a SMS equipped device. The method sends a text message that includes a list of available online SMS games to the SMS equipped device. The method receives a text message from the SMS equipped device that indicates a selected SMS game from the list of available online SMS games. The method sends a text message to the SMS equipped device to initiate playing of the selected SMS game.

15 Claims, 6 Drawing Sheets

SYSTEM AND METHOD FOR PROVIDING ONLINE SMS GAMES

BACKGROUND OF THE INVENTION

The present invention relates to providing an online short message service (SMS) gaming service that is accessible by any SMS equipped device, such as, but not limited to, a mobile phone. SMS is a communications protocol allowing the interchange of short text messages between mobile telephone devices and/or data processing systems. As referenced herein, the term "SMS" is used as a synonym for a text message or the act of sending a text message, even when a different protocol is being used. SMS text messaging is currently the most widely used data application on the planet, with 2.4 billion active users, or 74% of all mobile phone subscribers sending and receiving text messages on their phones. Multimedia messaging service (MMS) is an extension of the SMS standard, allowing longer message lengths and for sending messages that include multimedia objects, such as, but not limited to, images, audio, video, and rich text.

SUMMARY

In accordance with the disclosed embodiments, a system and method is presented for providing online SMS games. In one embodiment, the method includes receiving a text message from a SMS equipped device. The method sends a text message that includes a list of available online SMS games to the SMS equipped device. The method receives a text message from the SMS equipped device that indicates a selected SMS game from the list of available online SMS games. The method sends a text message to the SMS equipped device to initiate playing of the selected SMS game.

BRIEF DESCRIPTION OF THE DRAWINGS

For a more complete understanding of the present application, the objects and advantages thereof, reference is now made to the following descriptions taken in conjunction with the accompanying drawings, in which.

DETAILED DESCRIPTION OF THE DRAWINGS

In accordance with the disclosed embodiments, a system and method is presented for providing online SMS games to any SMS equipped device without having to install any additional applications on the SMS equipped device. Further, in some embodiments, the users of SMS equipped devices are not required to sign up, register, log in, and/or perform any additional preceding steps with the SMS online gaming service prior to sending a text message to the online SMS gaming service at the time a user desires to play an online SMS game.

The disclosed embodiments and advantages thereof are best understood by referring to FIGS. 1-7 of the drawings, like numerals being used for like and corresponding parts of the various drawings. Other apparatus features and advantages of the disclosed embodiments will be or will become apparent to one of ordinary skill in the art upon examination of the following figures and detailed description. It is intended that all such additional apparatus, features and advantages be included within this description, be within the scope of the disclosed embodiments, and be protected by the accompanying drawings. Further, the illustrated figures are only exemplary embodiments of the present invention and are not intended to assert or imply any limitation with regard to the environments, process, and/or architecture in which different embodiments may be implemented.

Figure 1:
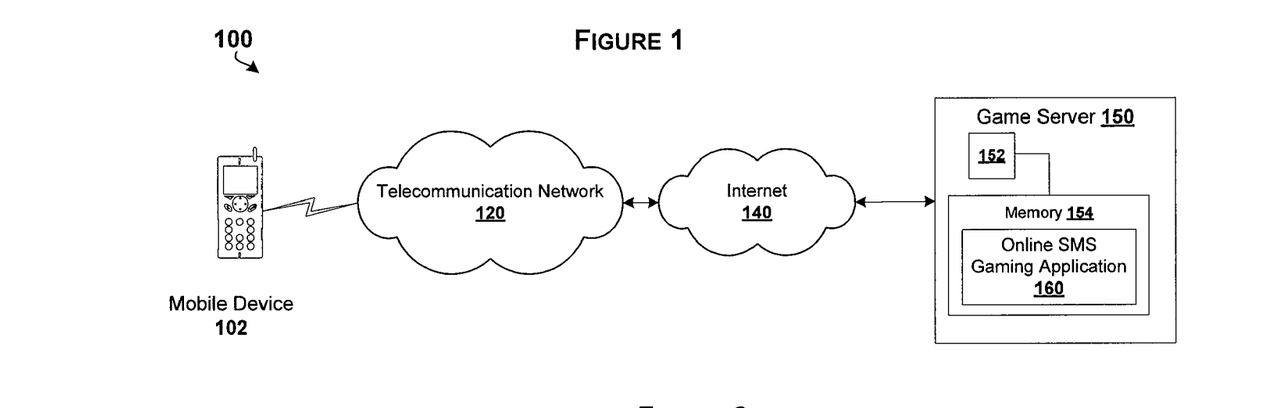
FIG. 1 depicts an embodiment of a network environment in which the illustrative embodiments may be implemented.

With reference now to the figures, FIG. 1 depicts a network environment 100 in which the illustrative embodiments may be implemented for providing online SMS games to an SMS equipped device, such as, but not limited to, mobile device 102. In the depicted embodiment, mobile device 102 is handheld computing and/or communication device, such as, but not limited to, a cellular phone and/or a personal digital assistant (PDA). Additionally, in some embodiments, a SMS equipped device may include a personal computer or any other type of data processing system that is capable of sending and receiving SMS messages.

In the depicted embodiment, mobile device 102 communicates with other mobile devices and/or computing devices, such as, but not limited to, game server 150, through telecommunication network 120 and Internet 140. Mobile device 102 is associated with special codes/identifiers that are used to uniquely identify mobile device 102 within telecommunication network 120 and Internet 140. In some embodiments, the special codes/identifiers are also used to identify a service provider and/or a subscriber associated with mobile device 102.

Telecommunication network 120 includes a plurality of base transceiver stations for facilitating wireless communication between mobile device 102 and a mobile switching center. For example, in some embodiments, mobile device 102 transmits a registration request that includes the special codes/identifiers to a mobile switching center within telecommunication network 120 via a base transceiver station. The mobile switching center uses the data from the registration request to identify mobile device 102 and to determine the location/cellular sub-system to route communications/calls to mobile device 102.

In addition, in some embodiments, telecommunication network 120 may include one or more SMS gateways and SMS centers for facilitating SMS/text message communication between mobile device 102 and other SMS equipped devices. A SMS center is used to store and route the SMS message to an intended recipient. A SMS gateway is used to communicate SMS messages between the different network entities within telecommunication network 120 that utilize different communication protocols for SMS messaging.

In the depicted embodiment, telecommunication network 120 is communicatively coupled to Internet 140. Internet 140 is a global system of interconnected computer networks that interchange data using the standardized Internet Protocol Suite (TCP/IP). Internet 140 includes millions of private and public networks that are linked by copper wires, fiber-optic cables, wireless connections, and other technologies.

In accordance with one embodiment, mobile device 102 sends and receives SMS messages to and from game server 150 via telecommunication network 120 and Internet 140 for facilitating playing of online SMS games, such as, but not limited to, chess, checkers, battleship, and poker. In one embodiment, game server 150 includes a processing unit 152 for executing computer usable program code, such as, but not limited to, an online SMS gaming application 160 stored in memory 154.

Figure 2:
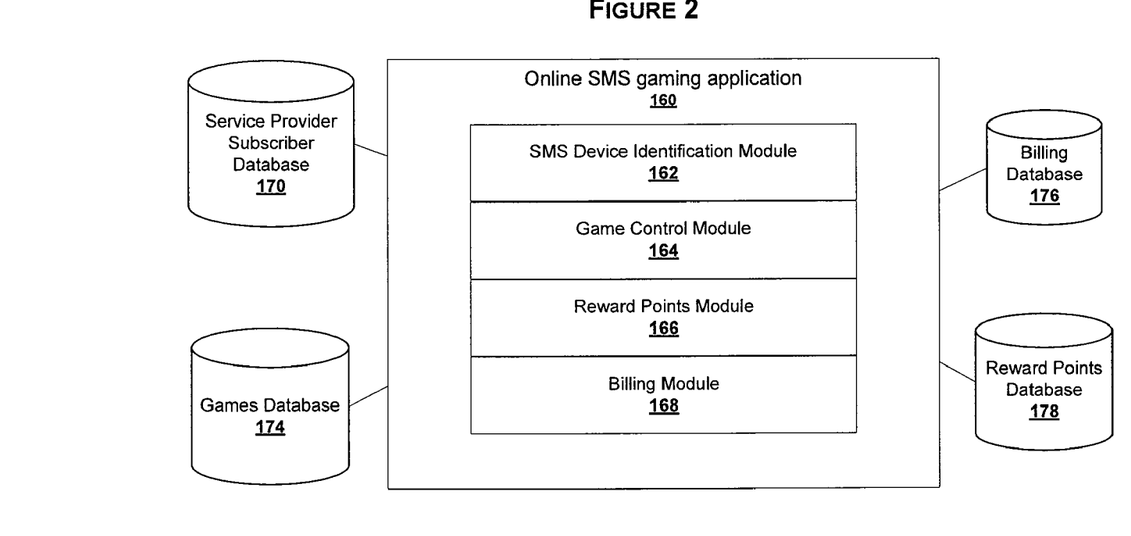
FIG. 2 depicts a online SMS gaming application in accordance with one embodiment of the invention.

FIG. 2 depicts an embodiment of online SMS gaming application 160. In the depicted embodiment, online SMS gaming application 160 includes a SMS device identification module 162, a game control module 164, a reward points module 166, and a billing module 168. In addition, in some embodiments, online SMS gaming application 160 communicates with one or more, local or remote data stores, such as, but not limited to, a service provider subscriber database 170, a games database 174, a billing database 176, and a reward points database 178.

SMS device identification module 162 includes computer usable program code to identify a SMS equipped device for facilitating playing of an online SMS game on the SMS equipped device. For example, in one embodiment, SMS device identification module 162 identifies a SMS equipped device that facilitated the transmission of an SMS message to game server 150 using the special codes/identifiers, such as, but not limited to, the mobile identification number and/or the IP address, associated with the SMS equipped device. In addition, in some embodiments, SMS device identification module 162 identifies a service provider associated with the identified SMS equipped device. For example, in one embodiment, SMS device identification module 162 communicates with service provider subscriber database 170 to determine a service provider associated with the mobile identification number of a SMS equipped device. Additionally, in some embodiments, SMS device identification module 162 determines whether the service provider associated with the SMS equipped device has a pay agreement with a provider of the online SMS games (e.g., the provider of the online SMS games may receive a penny for every SMS message that is sent and received by game server 150). In some embodiments, an individual user of a SMS equipped device may have a pay agreement with the provider of game server 150 to access and play the online SMS games of game server 150. Further, in other embodiments, the online SMS games of game server 150 may be freely available and accessible to all SMS equipped device. For instance, in some embodiments, advertisements may be included in one or more text messages associated with an online SMS game to defer the costs of providing the online SMS games for free to any SMS equipped device.

Game control module 164 includes computer usable program code to facilitate playing of an online SMS game. In one embodiment, in response to receiving a text message from a SMS equipped device, game control module 164 sends a text message that includes a list of available online SMS games to the SMS equipped device. For example, in one embodiment, game control module 164 queries games database 174 to generate a list of available online SMS games. In some embodiments, the initial text message from the SMS equipped device may be a blank text message. In response to receiving a text message from the SMS equipped device that indicates a selected SMS game from the list of available online SMS games, game control module 164 sends a text message to the SMS equipped device to initiate playing of the selected SMS game. In some embodiments, the text message to initiate playing of the selected SMS game is a text message that requests the user of the SMS equipped device to perform an action associated with the selected SMS game (i.e., specify a move to make associated with the selected SMS game). In other embodiments, the text message to initiate playing of the selected SMS game is a text message that includes an option for the user to receive instructions for playing the selected SMS game, and/or for playing the selected SMS game against a second user, and/or to continue playing a previously stored game associated with the SMS equipped device.

Further, in some embodiments, game control module 164 includes computer usable program code to handle the game play interaction between the SMS equipped device and game server 150. For instance, in some embodiments, game control module 164 performs a user specified action associated with a selected SMS game that is specified in a text message received from a SMS equipped device. Additionally, in some embodiments, if at least one other player is playing the selected SMS game against a user of the SMS equipped device, game control module 164 sends a text message to the at least one other player to indicate the action taken by the user and to request the other player(s) to specify an action to perform for the selected SMS game. However, if the user is playing the selected SMS game against a computer, in one embodiment, game control module 164 performs the action specified by the user and then performs a computer specified action and sends a text message to the user indicating the action taken by the computer. In one embodiment, game control module 164 includes computer executable instructions to determine after performing an action specified by a player and/or by a computer whether a winning condition has occurred. Game control module 164 notifies the user and/or any other player associated with the selected SMS game of an occurrence of the winning condition.

Additionally, in some embodiments, the text message may include an image of the current state of the selected SMS game. In some embodiments, the image may be an image file, such as, but not limited to, a gif and/or jpeg image file, transmitted with the SMS using MMS or similar technology. In another embodiment, the image may be comprise solely of textual keyboard characters, such as, but not limited to, alphanumeric characters and/or symbols, used to generate a picture that resembles the current state of the selected SMS game.

In addition, in some embodiments, game control module 164 monitors for a user response within a specified time, such as, but not limited to, one minute. For example, in some embodiments, if a first user is playing an online SMS game against a second user and a response is not received from the user whose turn it is, e.g., the second user, within a specified time period, such as, but not limited to, thirty seconds, game control module 164 sends the second user a time out warning text message. If a response is still not received from the second user within a specified time period after sending the time out warning text message, game control module 164 sends a time out text message to the second user indicating that the second user has been logged off/disassociated with the online SMS game. Game control module 164 also sends a notification text message to the first user that the second user has been disassociated with the SMS game. In some embodiments, the user may continue playing the selected online SMS game with any remaining players/users, such as, in the case of a poker game, or the user may continue playing the selected online SMS game against a computer.

In one embodiment, reward points module 166 handles reward points associated with a particular mobile device and/or user. In some embodiments, the rewards points associated with a particular SMS equipped device/user may be stored in reward points database 178. For example, in some embodiments, a user may earn reward points based on the number of text messages sent and received from a SMS equipped device associated with the user. Additionally, in some embodiments, a user may earn reward points based on an outcome of a selected SMS game. For example, if the user wins a checkers game, the user may receive a specified number of rewards points. In some embodiments, a user may win reward points from other users, e.g., in a SMS poker game. In one embodiment, the reward points may be redeemable for goods and/or services via an internet website. In other embodiments, the reward points may be redeemable for goods and/or services using SMS messages. For example, in one embodiment, reward points module 166 may send to a SMS equipped device a SMS message that includes the number of reward points earned and the goods and/or services available based on the number of reward points earned. A user may send a text message back indicating a selected good and/or service.

Billing module 168 handles billing for game server 150 in the embodiments in which the provider of game server 150 charges a fee for its services. In some embodiments, the fee may be charged to an individual user, a service provider, and/or an advertiser. For example, in some embodiments, billing module 168 may log the number of text messages sent and received from a particular SMS equipped device in billing database 176 for billing the SMS service provider and/or user associated with the particular SMS equipped device. In other embodiments, billing module 168 may track the number of advertisements that are sent out to SMS equipped devices for billing a particular advertiser.

Figure 3:
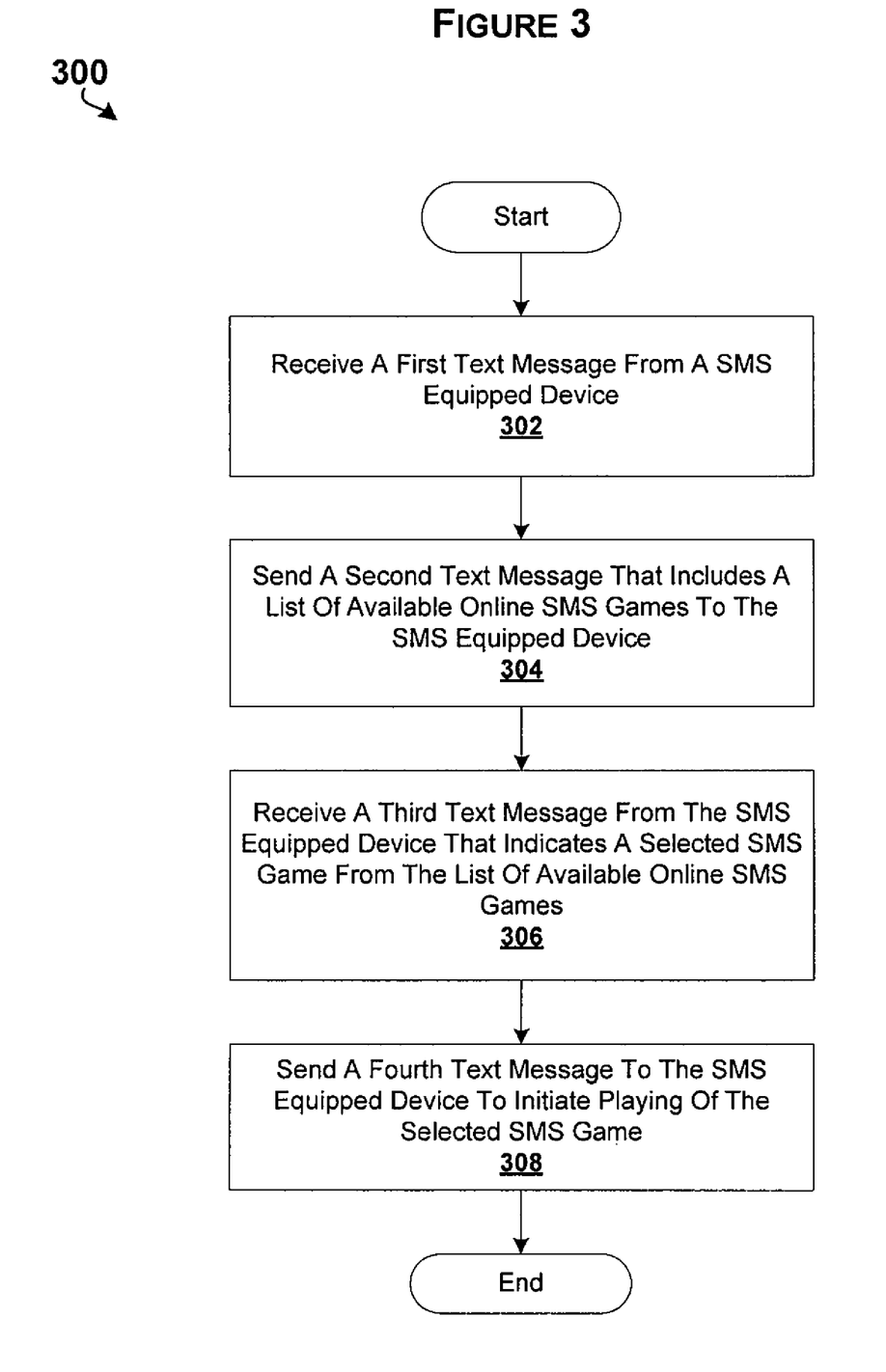
FIG. 3 depicts a process for providing online SMS games to a SMS equipped device in accordance with one embodiment.

FIG. 3 depicts a process 300 for providing online SMS games to a SMS equipped device in accordance with one embodiment of online SMS gaming application 160. For example, in one embodiment, process 300 may be used to provide a free SMS online gaming service to all SMS equipped devices. Process 300 begins by receiving a text message from a SMS equipped device at step 302. For example, in one embodiment, the SMS equipped device may send a blank text message to a phone number associated with game server 150. At step 304, the process sends a text message that includes a list of available online SMS games to the SMS equipped device. The process receives a text message from the SMS equipped device that indicates a selected SMS game from the list of available online SMS games at step 306. The process then sends a text message to the SMS equipped device to initiate playing of the selected SMS game at step 308, with process 300 terminating thereafter.

Figure 4:
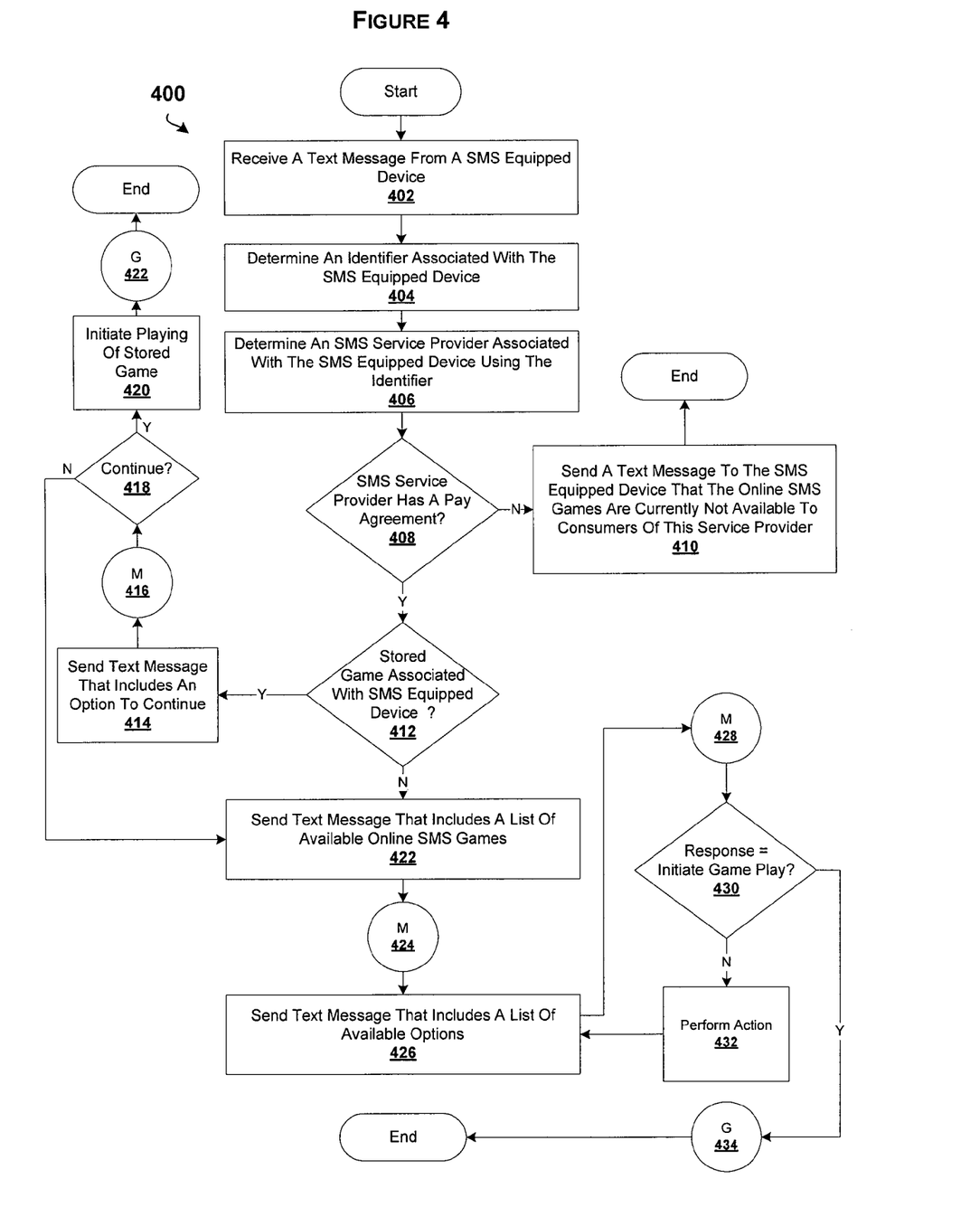
FIG. 4 depicts another embodiment of a process for providing online SMS games to a SMS equipped device.

FIG. 4 depicts a process 400 for providing online SMS games to a SMS equipped device in accordance with another embodiment of online SMS gaming application 160. For example, in one embodiment, process 400 may be used to provide SMS online gaming service to SMS equipped devices that utilize a service provider that has a pay agreement with the provider of game server 150. Process 400 begins by receiving a text message from a SMS equipped device at step 402. The process determines an identifier, such as, but not limited to, a telephone number, associated with the SMS equipped device at step 404. In one embodiment, the process uses the identifier to determine an SMS service provider associated with the SMS equipped device at step 406. At step 408, the process determines whether the SMS service provider has a pay agreement/arrangement with the provider of game server 150. If the SMS service provider does not have a pay agreement with the provider of game server 150, the process sends a text message to the SMS equipped device indicating that the SMS online gaming service is currently not available to consumers associated with their service provider, with process 400 terminating thereafter.

However, if the SMS service provider does have a pay agreement with the provider of game server 150, the process determines whether a stored game is associated with the SMS equipped device at step 412. If a stored game is associated with the SMS equipped device, the process sends a text message that includes an option to continue the previously stored game at step 414. The process monitors for a user response, as will be further described in FIG. 5, at step 416. If the process receives a text message to continue a previously stored game at step 418, the process initiates play of the stored gamed at step 420. The process then performs the game play process, as will be further described in FIG. 6, at step 422, with process 400 terminating thereafter.

On the other hand, if the process determines at step 412 that there are no previously stored games associated with the SMS equipped device or the user selects not to play a previously stored game at step 418, the process sends a text message that includes a list of available online SMS games to the SMS equipped device at step 422. At step 424, the process monitors for a user response to the previously sent text message. In response to response to receiving a selection from the list of available online SMS games, the process, at step 426, sends a text message that includes a list of available options to the SMS equipped device. For example, the list of available options may include, but are not limited to, receive instructions/rules for playing the selected SMS game, select a skill level, and/or begin playing of the selected SMS game. Again, the process monitors for a user response at step 428. If the process receives an instruction to begin play of the selected online SMS game from the user at step 430, the process performs the gameplay process at step 434, with process 400 terminating thereafter. If the process receives some other option at step 430, the process performs the desired option at step 432. The process then returns to step 426 and sends a text message that includes a list of available options to the SMS equipped device.

Figure 5:
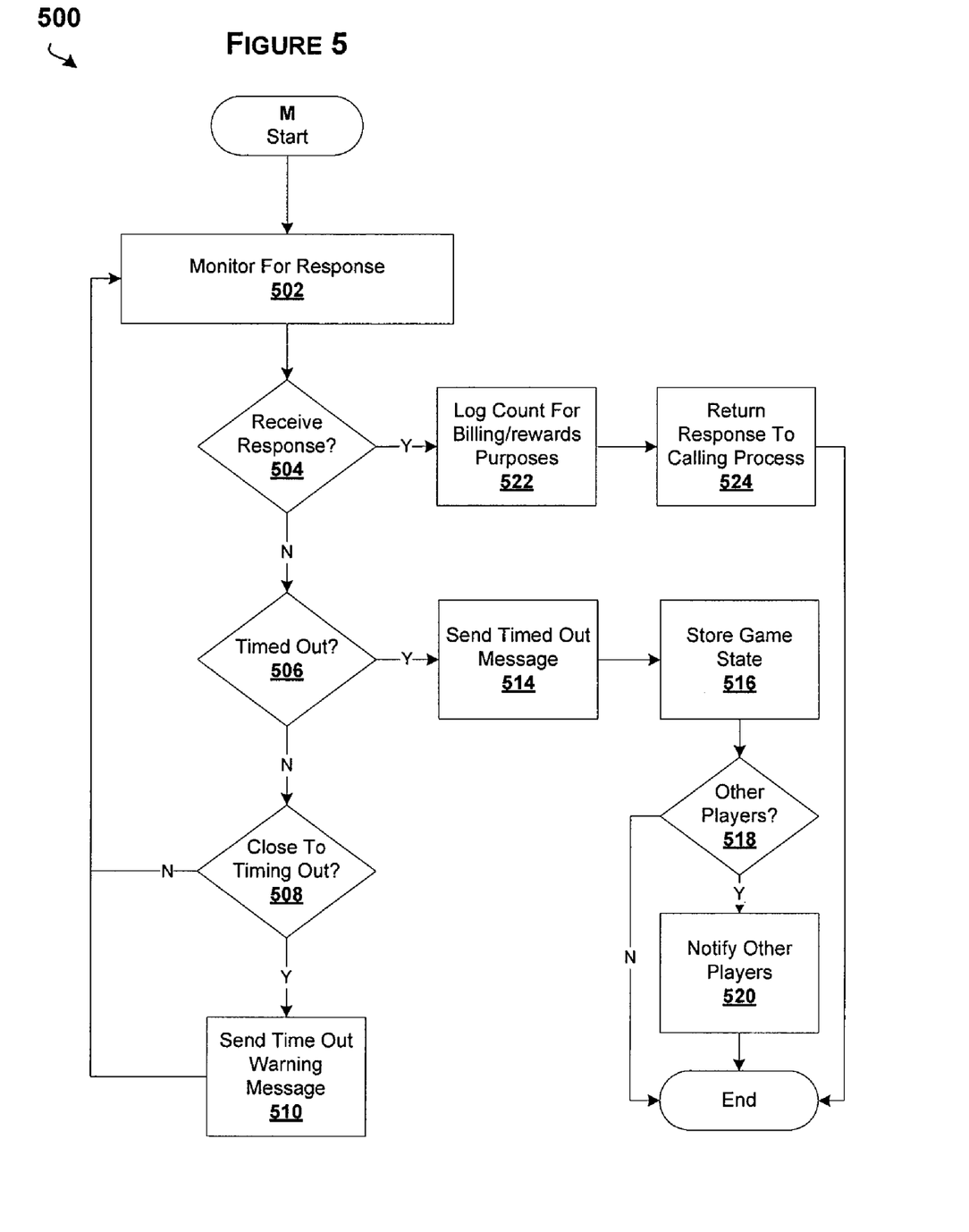
FIG. 5 depicts an embodiment of a process for monitoring for a user response associated with an online SMS game.

FIG. 5 depicts an embodiment of a process 500 for monitoring for a user response associated with an online SMS game. Process 500 begins by monitoring for a user response to a previously sent text message at step 502. At step 504, the process determines whether a response has been received. If a response has not been received, the process determines whether a specified time period for responding to a previously sent text message has elapsed at step 506. If the time period for responding to a previously sent text message has not elapsed, the process determines, at step 508, whether the available time period for responding to a previously sent text message is less than a predetermined time amount before the time for responding to a previously sent text message elapses. For example, in some embodiments, if the time period for responding to a previously sent text message is less than 30 seconds, the process sends a time out warning message to the SMS equipped device at step 510.

However, if the process determines at step 506 that the specified time period for responding to a previously sent text message has elapsed, the process sends a timed out text message to the timed out SMS equipped device at step 514. In some embodiments, the process will store the current state of the selected online SMS game at step 516, so the user of the SMS equipped device may continue playing the selected online SMS game at a later time. For example, if the user is playing a game of chess against the computer, the process stores the state of the game, so that a user may continue the game at a later time. In addition, in some embodiments, if the process, at step 518, determines that other users/players are associated with the selected online SMS game, the process notifies the other players at step 520, with process 500 terminating thereafter.

If monitoring process 500 receives a response within the specified time period for responding to a previously sent text message at step 504, the process logs the text message for billing and/or reward points purposes. For example, in some embodiments, the process maintains a count of the number of text messages sent and received from the SMS equipped device in order to properly bill the service provider associated with the SMS equipped device and/or for providing reward points to the user associated with the SMS equipped device. At step 524, the process returns the user response to the calling process, with process 500 terminating thereafter.

Figure 6:
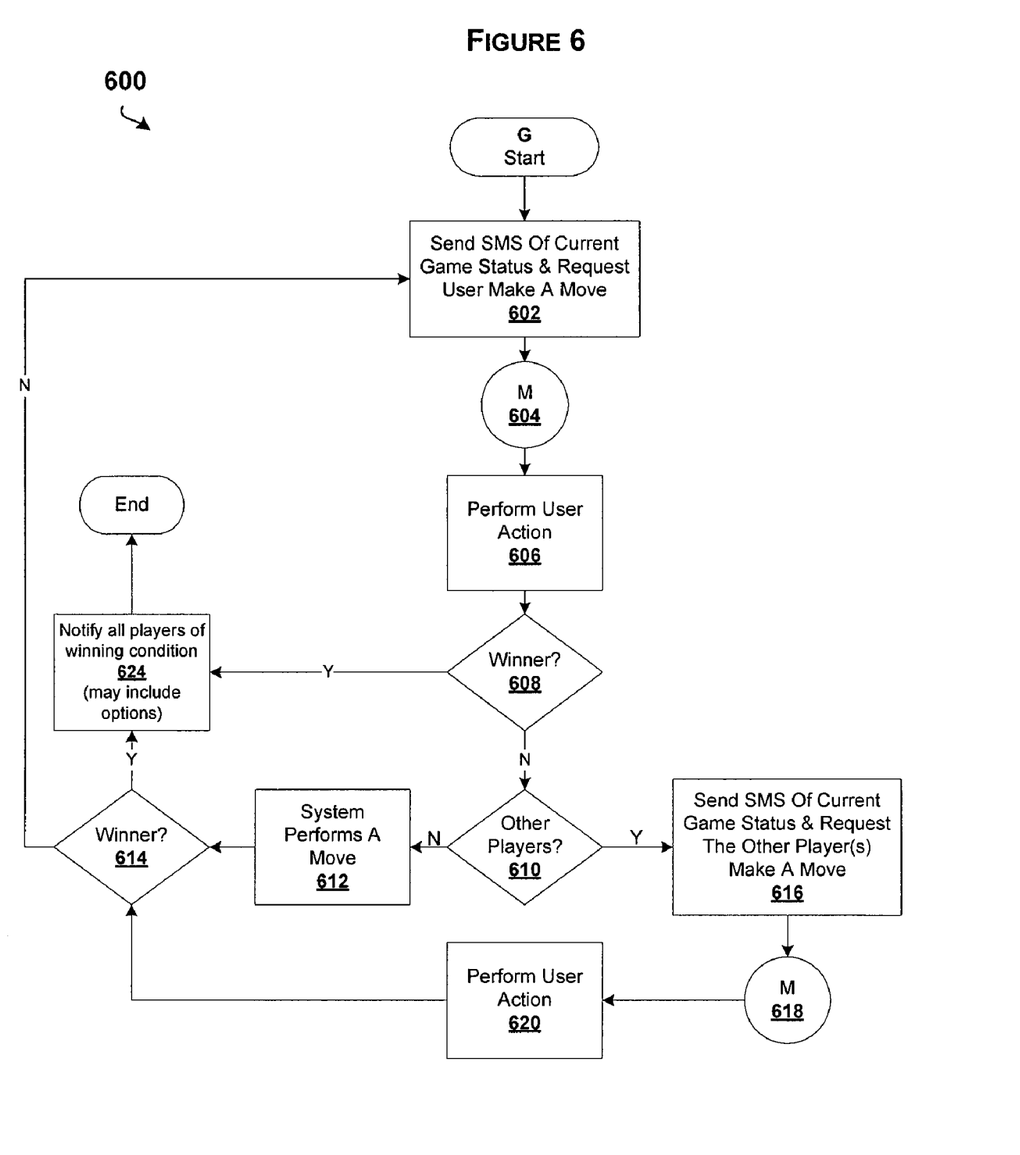
FIG. 6 depicts an embodiment of a process for performing a user designated action associated with an online SMS game.

FIG. 6 depicts an embodiment of a process 600 for performing a user designated action associated with an online SMS game. Process 600 begins by sending an SMS text message of the current game status to a SMS equipped device at step 602. In one embodiment, the SMS text message includes a request for the user to perform an action associated with the game. In some embodiments, depending on the particular SMS online game, the user specified action may be limited to a selection from a list of multiple choices. In other embodiments, the user may type in a user specified action in accordance with a prespecified format of the particular SMS online game. Additionally, in some embodiments, the SMS text message may include an image of the current game status. The process monitors for a user response at step 604. The process performs a user specified action at step 606. The process, at step 608, determines whether a winning condition has occurred after performing the user specified action. If a winning condition has not occurred, the process, at step 610, determines whether there are other players/users associated with the selected online SMS game. If there are other players, the process, at step 616, sends a text message of the current game status to the other players and requests the other players perform a user specified action. The process then monitors for a user response from the other players at step 618. In response to receiving a user response from the other players, the process performs the specified action at step 620. The process then determines whether a winning condition has occurred at step 614.

However, if a determination is made at step 610, that the user is playing against a data processing system, the process performs an action as designated by the data processing system at step 612. The process then determines whether a winning condition has occurred at step 614.

If a winning condition has not occurred, either at step 608 or step 614, the process returns to step 602 and sends an SMS text message of the current game status to the SMS equipped device. However, if the process determines that a winning condition has occurred, either at step 608 or step 614, the process notifies all players associated with the selected online SMS game of the winning condition at step 624, with process 600 terminating thereafter. In some embodiments, the text message notification may include options, such as, but not limited to, replaying the game and/or selecting a different online SMS game to play. Additionally, in some embodiments, the process may provide additional reward points to the users associated with the selected online SMS game based on the outcome of the selected SMS game.

Figure 7:
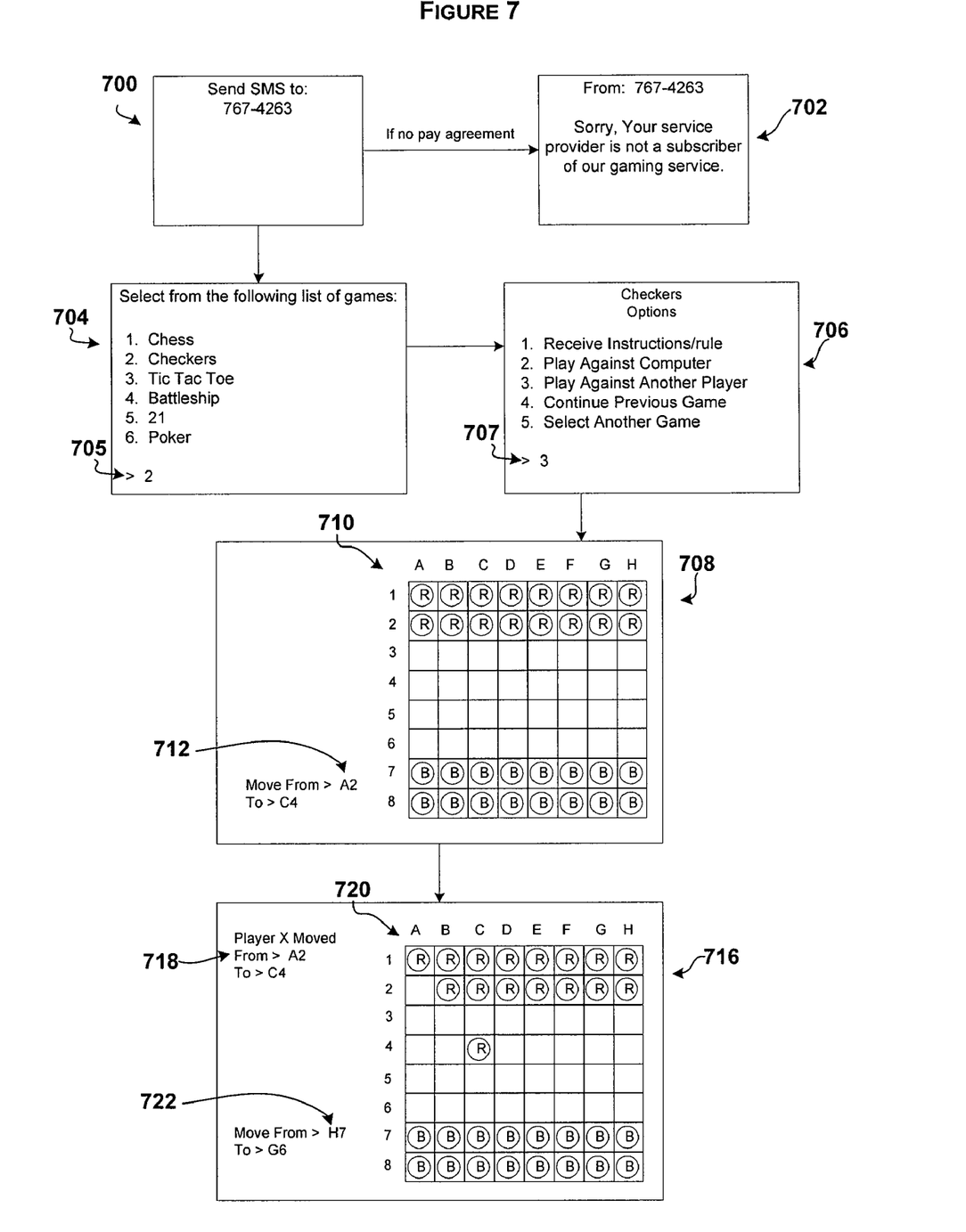
FIG. 7 depicts an example of a sequence of text messages received by a SMS equipped device in accordance with one embodiment of the invention.

FIG. 7 depicts an example of a sequence of text messages received by a SMS equipped device in accordance with one embodiment of the invention. Beginning with text message 700, the SMS equipped device sends a text message to game server 150. In one embodiment, if online SMS gaming application 160 determines that the SMS equipped device uses a service provider that does not have a pay arrangement with a provider of game server 150, the SMS equipped device recieves text message 702.

Text message 704 depicts an embodiment of a text message that is sent back to the SMS equipped device with a list of available online SMS games. In the depicted example, the user enters "2" after prompt 705 to indicate the selection of checkers.

Text message 706 depicts an embodiment of a text message that includes a list of options associated with the selected online SMS game. For example, in the depicted embodiment, the user may receive instructions/rules for playing checkers, choose to play against the computer or another player, continue a previously stored game, or select another online SMS game. In the depicted example, the user enters "3" after prompt 707 to indicate the selection of playing against another player.

Text message 708 depicts an embodiment of a text message that includes an image 710 of the current state of the selected online SMS game. In the depicted example, a user of the SMS equipped device enters an action 712 to move a checker piece from position A2 to position C4.

Text message 716 depicts an embodiment of a text message that includes an image 720 of the current state of the selected online SMS game that is sent to the second player following the move performed by the first player. In some embodiments, text message 716 includes an indication 718 of the action taken by the first player. In the depicted example, the second player enters an action 722 and sends text message 716 back to game server 150.

Accordingly, the disclosed embodiments present a system and method for providing online SMS games to any SMS equipped device without having to install any additional applications on the SMS equipped device. Further, the disclosed embodiments incentivize users to use the disclosed online SMS gaming service by providing reward points to the users based on the number of text messages that are sent and received by the online SMS gaming service and/or based on the outcome of a selected online SMS game. In addition, the disclosed embodiments describe several options for a provider of the disclosed online SMS gaming service to generate revenue for providing such a service.

As will be appreciated by one skilled in the art, the disclosed embodiments may be embodied as a system, method, or computer program product. Accordingly, the disclosed embodiments may be implemented entirely with hardware or as a software embodiment (including firmware, resident software, micro-code, etc.) or an embodiment combining software and hardware aspects that may all generally be referred to herein as a "circuit," "module" or "system." Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed:

1. A method for providing online short message service (SMS) games to a SMS equipped device, the method comprising:
   receiving, by a server, a first text message from the SMS equipped device;
   sending, by the server, a list of available online SMS games to the SMS equipped device in a second text message;
   receiving, by the server, a selected SMS game from the list of available online SMS games in a third text message from the SMS equipped device;
   sending a fourth text message to the SMS equipped device and rendering, by the SMS equipped device, the selected SMS game in response to the fourth text message;
   generating by the server a picture of a current state of the selected SMS game using keyboard characters; and
   sending a fifth text message to the SMS equipped device comprising an image, wherein the image includes the keyboard characters.

2. A method for providing online short message service (SMS) games to a SMS equipped device, the method comprising:
   receiving, by a server, a first text message from the SMS equipped device;
   determining, by the server, a SMS service provider associated with the SMS equipped device;
   determining, by the server, whether the SMS service provider has a pay agreement with a provider of the online SMS games;
   responsive to the SMS service provider not having the pay agreement with the provider of the online SMS games, sending, by the server, a second text message to the SMS equipped device to indicate to a user of the SMS equipped device that the online SMS games are currently not available to consumers of the SMS service provider;
   responsive to the SMS service provider having the pay agreement with the provider of the online SMS games, sending a third text message that includes a list of available online SMS games to the SMS equipped device;
   receiving a fourth text message from the SMS equipped device that indicates a selected SMS game from the list of available online SMS games;
   sending a fifth text message to the SMS equipped device and rendering, by the SMS equipped device, the selected SMS game in response to the fifth text message;
   generating by the server a picture of a current state of the selected SMS game using keyboard characters; and
   sending a sixth text message to the SMS equipped device comprising an image, wherein the image includes the keyboard characters.

3. The method of claim 2, further comprising:
   determining an identifier associated with the SMS equipped device; and
   using the identifier to determine the SMS service provider associated with the SMS equipped device.

4. The method of claim 2, wherein the fifth text message includes an option for the user to begin playing the selected SMS game.

5. The method of claim 2, wherein the fifth text message includes an option for the user to continue playing a previously stored game of the selected SMS game.

6. The method of claim 2, wherein the fifth text message includes an option for the user to receive instructions for playing the selected SMS game.

7. The method of claim 2, wherein the fifth text message includes an option for the user to play the selected SMS game against a second user.

8. The method of claim 2, further comprising logging a number of text messages sent and received from the SMS equipped device for billing the SMS service provider.

9. The method of claim 2, further comprising: responsive to a determination that a second player is playing the selected SMS game against the user, sending a seventh text message the second player indicating the action taken by the user.

10. The method of claim 2, further comprising: responsive to a determination that the user is playing the selected SMS game against a data processing system, performing a computer specified action associated with the selected SMS game; and sending a seventh text message to the user indicating the computer specified action taken by the data processing system.

11. The method of claim 10, further comprising storing a current state of the selected SMS game in memory.

12. The method of claim 9, further comprising:
monitoring for an eighth text message from the second player indicating a second action to perform associated with the selected SMS game;
responsive to not receiving the eighth text message within a specified time from the second player, sending the second player a time out text message indicating that the second player has been disassociated with the selected game and sending the user a notification text message that the second player has been disassociated with the selected game.

13. The method of claim 11, further comprising:
monitoring for a winning condition after every performed action associated with the selected SMS game; and
responsive to the winning condition occurring, notifying the user and any other player associated with the selected SMS game of an occurrence of the winning condition.

14. The method of claim 13, further comprising:
providing reward points for the user based on an outcome of the selected SMS game.

15. An online short message service (SMS) gaming service apparatus comprising:
memory coupled to a processing unit, the memory includes computer executable program code; and
the processing unit executes the computer executable program code to perform the steps of:
receiving, by the online SMS gaming service apparatus, a first text message to play an online SMS game from a SMS equipped device;
determining a SMS service provider associated with the SMS equipped device;
determining, by the online SMS gaming service apparatus, whether the SMS service provider has a pay agreement with a provider of the online SMS games;
sending a second text message to the SMS equipped device to indicate to a user of the SMS equipped device that the online SMS games are currently not available to consumers of SMS service provider in response to the SMS service provider not having the pay agreement with the provider of the online SMS games;
sending a third text message that includes a list of available online SMS games to the SMS equipped device in response to the SMS service provider having the pay agreement with the provider of the online SMS games;
receiving a selection of an SMS (lame from the list of available online SMS games by receiving a fourth text message from the SMS equipped device;
sending a fifth text message to the SMS equipped device and rendering, by the SMS equipped device, the selected SMS game in response to the fifth text message;
generating by the online SMS gaming service apparatus, a picture of a current state of the selected SMS game using keyboard characters; and
sending a sixth text message to the SMS equipped device comprising an image, wherein the image includes the keyboard characters.

\* \* \* \* \*